United States Patent [19]

Asano

[11] Patent Number: 5,636,091
[45] Date of Patent: Jun. 3, 1997

[54] MAGNETIC DISK APPARATUS

[75] Inventor: Takahiro Asano, Tokyo, Japan

[73] Assignee: Kabushiki Kaisha Toshiba, Kawasaki, Japan

[21] Appl. No.: 364,401

[22] Filed: Dec. 23, 1994

Related U.S. Application Data

[63] Continuation of Ser. No. 218,832, Mar. 28, 1994, abandoned, which is a continuation of Ser. No. 853,563, Mar. 5, 1992, abandoned.

[30] Foreign Application Priority Data

Mar. 29, 1991 [JP] Japan ................................ 3-066595

[51] Int. Cl.$^6$ ........................................................ G11B 5/54
[52] U.S. Cl. .................................. 360/106; 360/97.01
[58] Field of Search ........................... 360/97.01, 97, 360/97.03, 98, 97.02, 99.08, 106

[56] References Cited

U.S. PATENT DOCUMENTS

| 4,553,183 | 11/1985 | Brown et al. | 360/98 |
|---|---|---|---|
| 4,725,904 | 2/1988 | Dalziel | 360/97 |
| 5,124,856 | 6/1992 | Brown et al. | 360/97.03 |
| 5,138,506 | 8/1992 | Beck et al. | 360/97.03 |
| 5,270,887 | 12/1993 | Edwards et al. | 360/106 |
| 5,315,464 | 5/1994 | Tsujino | 360/99.08 |

FOREIGN PATENT DOCUMENTS

| 0467556 | 1/1992 | European Pat. Off. | 360/106 |
|---|---|---|---|
| 62-279587 | 12/1987 | Japan | 360/97.01 |
| 0094192 | 4/1990 | Japan | 360/109 |

*Primary Examiner*—John H. Wolff
*Assistant Examiner*—David D. Davis
*Attorney, Agent, or Firm*—Finnegan, Henderson, Farabow, Garrett & Dunner, L.L.P.

[57] ABSTRACT

A hard disk drive includes a casing and a cover closing a top opening of the casing. In the casing are arranged a magnetic disk, magnetic heads for recording and reproducing information on and from the disk, a carriage supporting the magnetic heads, and a voice coil motor having a magnet, for driving the carriage. The cover is formed of a material with a high magnetic permeability and constitutes a magnetically permeable section which faces the magnet and allows a magnetic flux from the magnet to flow in the permeable section.

8 Claims, 3 Drawing Sheets

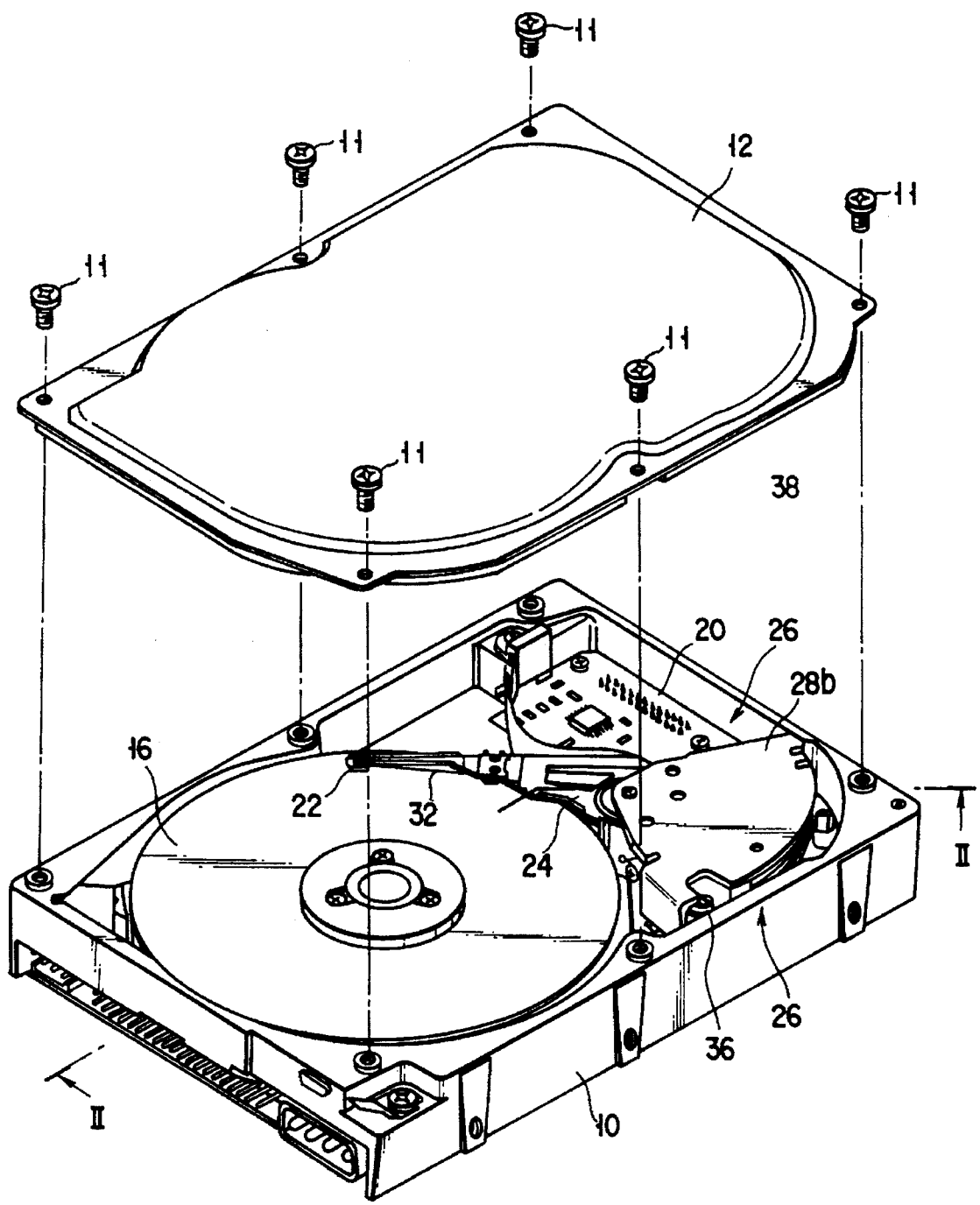
F I G. 1

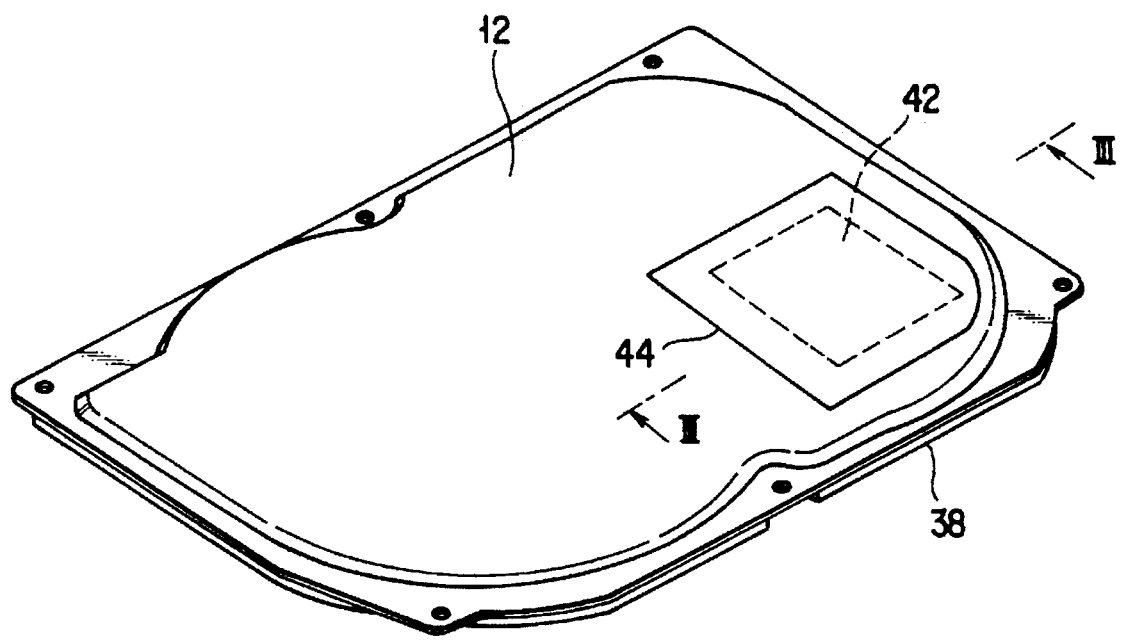
F I G. 3
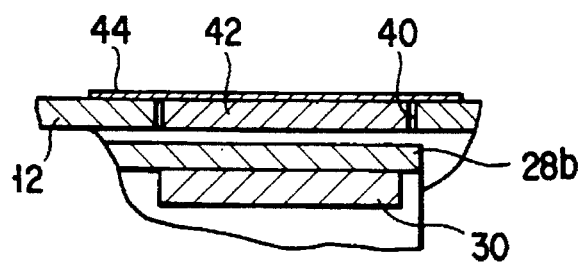
F I G. 4
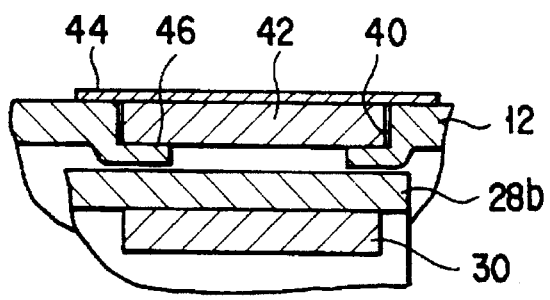
F I G. 5

MAGNETIC DISK APPARATUS

This application is a continuation of application Ser. No. 08/218,832 filed Mar. 28, 1994, now abandoned, which is a continuation application of Ser. No. 07/853,563 filed Mar. 5, 1992, now abandoned.

BACKGROUND OF THE INVENTION

1. Field of the Invention

The present invention relates to a magnetic disk apparatus for use as data storage means in, for example, a personal computer.

2. Description of the Related Art

Recently, magnetic disk apparatuses have been developing a tendency to smaller size and lighter weight, and are expected to be positively improved in assembly accuracy. In a small-sized magnetic disk apparatus, in particular, a casing and a top cover are manufactured using the same material, e.g., aluminum, so that bad influences of thermal strain of these members are reduced.

In general, magnetic disk apparatuses comprise a voice coil motor (hereinafter referred to as VCM) for moving a magnetic head in the radial direction of a magnetic disk. The VCM includes a voice coil and a magnet, which can move relatively to each other, and a yoke. This magnet generates a magnetic flux directed to the outside of the casing, as well as one directed to the coil. The greater part of the outward magnetic flux passes through the yoke and the top cover bound for the opposite magnetic pole, while the remaining part leaks out through the top cover. It is advisable, therefore, to provide the magnetic disk apparatuses with a magnetic shielding mechanism for preventing the magnetic flux from the magnet from leaking to the outside of the casing. In a relatively large-sized magnetic disk apparatus, the casing has a generous inside space, so that the magnetic shielding mechanism can be easily set in the casing.

In a small-sized magnetic disk apparatus, however, the inside space of the casing is so limited that it is difficult to provide the mechanism for preventing leakage of the magnetic flux. In the aforesaid case where both the casing and the top cover are formed from aluminum, in order to reduce the weight and prevent thermal strain, in particular, the magnetic flux from the magnet leaks out at once. The leakage of the magnetic flux exerts a bad influence on other equipment located close to the magnetic disk apparatus. In a production line for magnetic disk apparatuses, for example, leakage of the magnetic flux from one apparatus may possibly destroy data recorded on magnetic disks in adjacent apparatuses.

SUMMARY OF THE INVENTION

The present invention has been contrived in consideration of these circumstances, and its object is to provide a magnetic disk apparatus which can be reduced in size and weight, and in which leakage of a magnetic flux to the outside can be considerably reduced.

In order to achieve the above object, a magnetic disk apparatus according to the present invention comprises: a casing having a top opening; a magnetic disk rotatably arranged in the casing; a magnetic head for recording and reproducing information on and from the magnetic disk; carriage means arranged in the casing, for supporting the magnetic head for movement in the radial direction of the magnetic disk; drive means for moving the carriage means, the drive means being arranged in the casing and including a magnet; and a cover closing the top opening of the casing. The cover includes a magnetically permeable section facing the magnet and formed of a high magnetic permeability material.

According to the magnetic disk apparatus constructed in this manner, the cover includes the magnetically permeable section which faces the magnet, so that the greater part of a magnetic flux directed to the outside of the casing flows in the magnetically permeable section. As a result, leakage of the magnetic flux to the outside is considerably reduced.

According to an aspect of the invention, the whole cover is formed of a high magnetic permeability material, and constitutes the magnetically permeable section.

According to another aspect of the invention, the cover includes a magnetically permeable section which is attached only to that portion which faces the magnet.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 and 2 show a hard disk drive according to an embodiment of the present invention, in which:

FIG. 1 is an exploded perspective view of the apparatus, and

FIG. 2 is a longitudinal sectional view of the apparatus;

FIG. 3 is a perspective view of a top cover according to a modification of the embodiment;

FIG. 4 is a sectional view taken along line III—III of FIG. 3; and

FIG. 5 is a sectional view showing a second modification of the top cover.

DETAILED DESCRIPTION OF THE PREFERRED EMBODIMENTS

Figure 2:
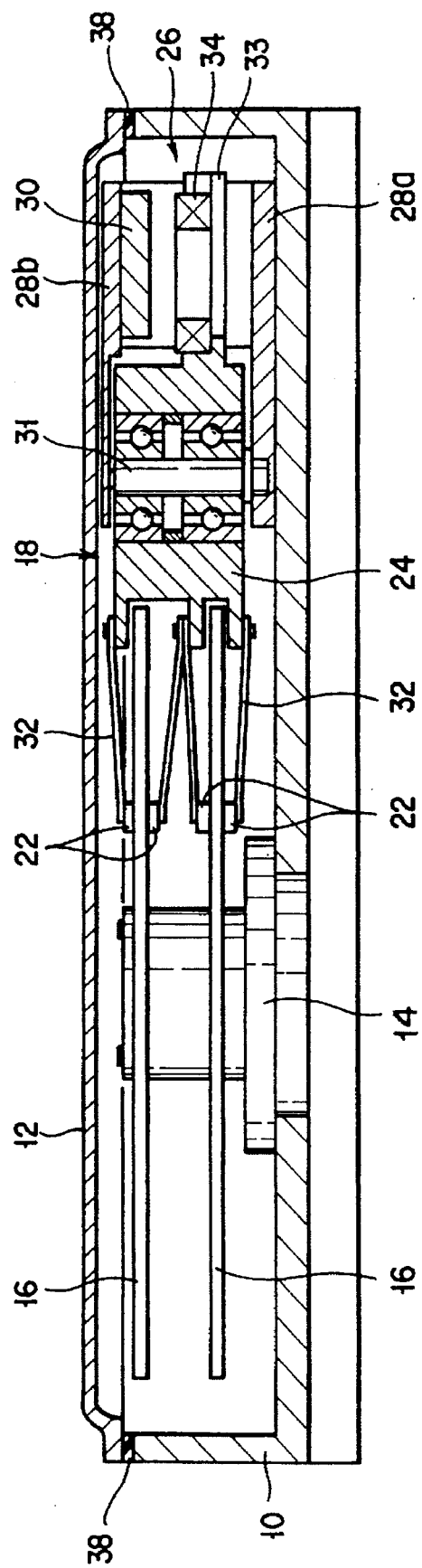

A hard disk drive (hereinafter referred to as HDD) according to an embodiment of the present invention will now be described in detail with reference to the accompanying drawings.

As shown in FIGS. 1 and 2, the HDD comprises a casing 10, in the form of a flat, rectangular open-topped box, and a top cover 12 fixed to the top face of the casing by means of a plurality of screws 11 and closing the top opening of the casing.

The casing 10 is formed of, for example, aluminum. A spindle motor 14 is mounted on the bottom wall of the casing 10. Two magnetic disks 16, for example, are fitted on the spindle of the motor 14. Adjoining the magnetic disks 16, a rotary-type carriage assembly 18 and a flexible printed circuit board 20 mounted with a preamplifier for amplifying output signal from magnetic heads are arranged in the casing 10.

The carriage assembly 18 includes a carriage 24, which supports two pairs of magnetic heads 22, and a voice coil motor 26 for rotating the carriage. The motor 26 includes a lower yoke 28a fixed on the bottom wall of the casing 10, an upper yoke 28b overlying the lower yoke, and a permanent magnet 30 fixed to the inner surface of the upper yoke.

The intermediate portion of the carriage 24 is rotatably supported by means of a pivot 31, which is mounted between the yokes 28a and 28b. The carriage 24 has four suspensions 32 extending from the intermediate portion thereof toward the magnetic disks 16. The magnetic heads 22 are mounted on the respective extending ends of the suspensions 32. As the carriage 24 rotates, the magnetic heads 22 move on the respective surfaces of their opposite magnetic disks 16 in the radial direction of the disks.

The carriage 24 includes a supporting portion 33 extending from the intermediate portion thereof and situated between the lower yoke 28a and the magnet 30. The supporting portion 33 is fixedly fitted with a voice coil 34 which, situated between the lower yoke 28a and the magnet 30, constitutes part of the voice coil motor 26.

When driving current is supplied to the voice coil 34, the coil, along with the carriage 24, is rotated around the pivot 31 by an interaction between magnetic fields generated individually from the coil and the magnet 30. As a result, the magnetic heads 22 move on the magnetic disks 16 in the radial direction thereof (seek operation), thereby recording or reproducing desired information. A pair of stoppers 36 (only one of which is shown), which are fixed to the lower yoke 28a, regulates the range of rotation of the carriage 24, and prevents the magnetic heads 22 from moving beyond predetermined regions of the magnetic disks 16.

The top cover 12, which closes the top opening of the casing 10, is formed of a material consisting mainly of a high magnetic permeability substance, such as iron, and the whole cover constitutes a magnetically permeable section of the present invention. The top cover 12 may be formed of any other material, such as a permalloy or ferrite alloy, which enjoys high magnetic permeability. A gasket 38 formed of an elastic material is fixed to the inner surface of the cover 12, and is interposed between the top end edge of the casing 10 and the cover.

According to the HDD constructed in this manner, a magnetic flux directed upward or toward the upper yoke 28b and the top cover 12, as well as one directed downward or toward the voice coil 34, is generated from the magnet 30 when the voice coil motor 26 is operated. The upward magnetic flux passes through the upper yoke 28b bound for the opposite magnetic pole of the magnet 30. If the upper yoke is made relatively thin to reduce the size and weight of the HDD, however, part of the magnetic flux is transmitted through the upper yoke bound for the top cover 12. Since the top cover 12 is formed of the high magnetic permeability material, as mentioned before, the greater part of the magnetic flux transmitted through the upper yoke 28b flows in the cover 12 to be bound for the opposite magnetic pole of the magnet 30. Thus, the magnetic flux can be substantially prevented from leaking through the top cover 12, so that equipment located around the HDD cannot be influenced by leakage of the magnetic flux from the HDD.

It has conventionally been believed that a magnetic head is adversely affected by a magnetic flux in a top cover when the cover is formed of a high magnetic permeability material. An experiment conducted by the inventor hereof indicated that the magnetic head is hardly influenced by the magnetic flux, and there is no problem in use.

If the top cover 12 is formed of a material different from that of the casing 10, moreover, the cover or casing may possibly undergo thermal strain attributable to difference in thermal expansion coefficient when the HDD is heated. Since the thermal strain is very small, however, the position of the magnetic heads can be highly accurately controlled without being influenced by the thermal strain, by using a high accuracy head positioning control system, such as a sector servo system.

Since iron is higher in mechanical strength than aluminum, moreover, the top cover of iron can be made thinner than an aluminum version.

Thus, there may be provided the HDD which can be reduced in size and weight, and in which leakage of the magnetic flux to the outside can be considerably reduced.

It is to be understood that the present invention is not limited to the embodiment described above, and that various changes and modifications may be effected therein by one skilled in the art without departing from the scope of the invention.

In the above embodiment, for example, the top cover 12 is formed of the high magnetic permeability material so that the whole cover constitutes the magnetically permeable section. It is necessary, however, only that the permeable section be provided at least at that portion of the top cover which faces the magnet 30 of the voice coil motor 26. Even this arrangement can provide substantially the same effects or advantages of the foregoing embodiment.

According to a modification shown in FIGS. 3 and 4, the top cover 12 has an opening 40 formed in that portion thereof which faces the magnet 30 of the voice coil motor 26. The opening 40 is fitted with a plate member 42 which has substantially the same shape and size as the opening 40. The member 42 is held in place by means of an adhesive tape 44 which is pasted on the respective upper surfaces of the plate member and the top cover 12. The plate member 42, which is formed of a material consisting mainly of iron, constitutes a magnetically permeable section through which the magnetic flux flows.

According to a modification shown in FIG. 5, the top cover 12 has a flange 46 extending from the inner surface thereof toward an opening 40 which faces the magnet 30 of the voice coil motor 26. A plate member 42 is fitted in the opening 40 in a manner such that it rests on the flange 46, and is held by means of an adhesive tape 44.

The present invention is not limited to the arrangement of the HDD, and may be also applied to any other magnetic disk apparatus, such as a floppy disk drive.

What is claimed is:

1. A magnetic disk apparatus comprising:
   a casing having a bottom wall, a plurality of sidewalls, and an open top;
   a magnetic disk arranged in the casing;
   means for rotating the magnetic disk, the rotating means being mounted on the bottom of the wall of the casing;
   a magnetic head for recording and reproducing information on and from the magnetic disk;
   carriage means arranged in the casing, for supporting the magnetic head for movement in the radial direction of the magnetic disk;
   drive means arranged in the casing, for moving the carriage means, the drive means including upper and lower yokes and a magnet attached to one of the upper and lower yokes; and
   a cover magnetically coupled to the magnet through the upper yoke, for closing the open top of the casing and including a magnetically permeable section which faces the upper yoke and consists essentially of a material with a magnetic permeability higher than that of the casing, so that magnetic flux of the magnet bound for an opposite pole of the magnet flows in the magnetically permeable section;

whereby leakage of magnetic flux through the cover is substantially prevented.

2. An apparatus according to claim 1, wherein said cover includes an opening facing the upper yoke and a plate member fitted in the opening, the plate member being formed of a material with a magnetic permeability higher than that of the casing and constituting the magnetically permeable section.

3. An apparatus according to claim 2, wherein said cover includes means for holding the plate member in the opening.

4. An apparatus according to claim 3, wherein said holding means includes an adhesive tape pasted on the respective outer surfaces of the cover and the plate member.

5. An apparatus according to claim 4, wherein said holding means includes an extending portion extending from the cover into the opening, and said plate member rests on the extending portion.

6. An apparatus according to claim 1, wherein said material consists essentially of iron.

7. An apparatus according to claim 1, wherein the magnet is attached to the upper yoke, and the upper yoke is arranged between the cover and the magnet.

8. A magnetic disk apparatus comprising:

a casing having a bottom wall, a plurality of sidewalls, and an open top;

a magnetic disk arranged in the casing;

means for rotating the magnetic disk, the rotating means being mounted on the bottom of the wall of the casing;

a magnetic head for recording and reproducing information on and from the magnetic disk;

carriage means arranged in the casing, for supporting the magnetic head for movement in the radial direction of the magnetic disk;

drive means arranged in the casing, for moving the carriage means, the drive means including upper and lower yokes and a magnet attached to one of the upper and lower yokes;

a cover magnetically coupled to the magnet through the upper yoke, for closing the open top of the casing; and means for preventing a magnetic flux from the magnet from leaking to the outside of the cover by causing the magnetic flux that is bound for an opposite pole of the magnet to flow in the cover, the preventing means including a magnetically permeable section of a permeability material with a magnetic permeability higher than that of the casing and constituting at least that portion of the cover which faces the upper yoke.

* * * * *